United States Patent Office 2,993,045
Patented July 18, 1961

2,993,045
NEW WATER-SOLUBLE DYESTUFFS OF THE THIOXANTHONE AND ACRIDONE SERIES
Max Staeuble, Basel, and Kurt Weber, Bottmingen, Switzerland, assignors to Ciba Company, Inc., Fair Lawn, N.J.
No Drawing. Filed Dec. 13, 1957, Ser. No. 702,510
Claims priority, application Switzerland Dec. 18, 1956
11 Claims. (Cl. 260—249)

This invention provides new water-soluble dyestuffs, which contain, in addition to at least one group imparting solubility in water and an at least monohalogenated 1:3:5-triazine radical, a heterocyclic six-membered ring to both sides of which are fused aromatic nuclei and which ring contains a keto group and as the sole heteroatom a sulfur or nitrogen atom in para-position to the keto group.

These dyestuffs are made by condensing a trihalogen-1:3:5-triazine, especially cyanuric chloride (2:4:6-trichloro-1:3:5-triazine), with an advantageously water-soluble dyestuff which contains an acylatable amino group and a heterocyclic six-membered ring to both sides of which are fused aromatic nuclei and which ring contains as the sole heteroatom a sulfur or nitrogen atom in para-position to a keto group, and, if desired, with ammonia or a hydroxy-compound, for example, an aliphatic alcohol or phenol, or an amine of dyestuff or non-dyestuff character, and especially with an amino-carboxylic acid or amino-sulfonic acid, the condensation or condensations being carried out in such manner that there is obtained a dyestuff containing a halogen-1:3:5-triazine radical.

As dyestuffs of the aforesaid kind there may be used as starting materials dyestuffs of the acridone, benzophenone-sulfone and especially thioxanthone series. In addition to an acylatable amino group the dyestuffs used as starting materials advantageously contain at least one strongly acid group imparting solubility in water, such as a carboxyl group or especially a sulfonic acid group.

The dyestuffs used as starting materials therefore contain with advantage the basic structure of the formula

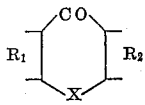

in which $R_1$ and $R_2$ each represent an aromatic radical, advantageously of the benzene or naphthalene series, fused on to the heterocyclic ring at the positions indicated by valency bonds, and X represents a sulfur atom which may be hexavalent as, for example, in the —$SO_2$— group, or a nitrogen atom. In these dyestuffs the acylatable, that is to say, primary or secondary, amino groups and, if desired, further substituents may be present in an external nucleus, that is to say, in a nucleus which is bound to one of the radicals $R_1$ and $R_2$ through an oxygen atom, a —CO— or —$CO_2$— group, a carboxylic acid amide group, or a sulfonic acid amide group or advantageously an —NH— group, as is the case in aminophenylamino-acridones or -thioxanthones. It is of advantage to use dyestuffs of this type which contain in the external nucleus a group imparting solubility in water, if the radicals $R_1$ and $R_2$ are free from such groups. The reactive amino group, instead of being bound to an external nucleus, may be bound directly or through an —$SO_2$— group or an alkylene radical to one of the radicals $R_1$ and $R_2$.

As dyestuffs to be used as starting materials there may be mentioned, for example, those of the formula

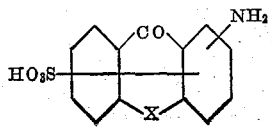

in which Y represents an —$SO_2$— group or an —NH— group, and especially thioxanthone dyestuffs, such as amino-thioxanthone sulfonic acids of the formulae

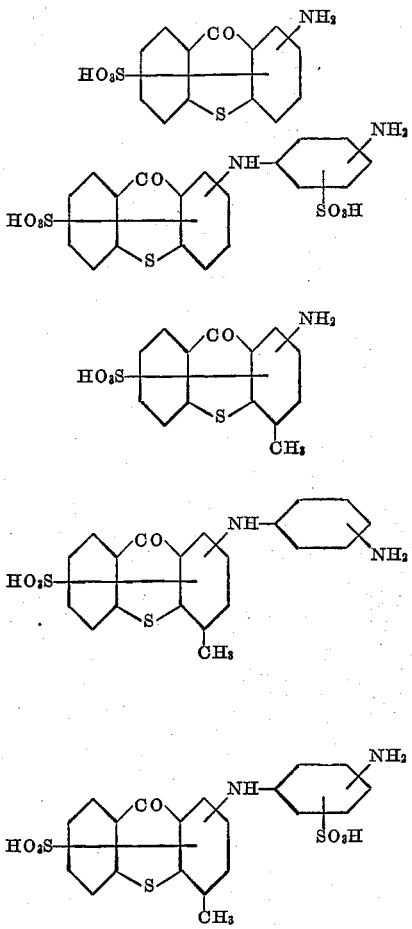

and and the corresponding thioxanthone-S-dioxides.

The starting materials used in the process of this invention are obtained, for example, also by reacting sulfonic acid halides of acridone or thioxanthone dyestuffs (such as are obtainable, for example, by treating the dyestuffs with chlorosulfonic acid or by reacting dyestuff sulfonic acids with acid halogenating agents such as phosphorus halides, thionyl chloride or chlorosulfonic acid) with organic compounds which contain an acylatable group, especially an acylatable amino group, and which contain in addition to the acylatable group, a further acylatable amino group or a substituent capable of being converted into such a group after the reaction with the dyestuff sulfonic acid halide. As such organic compounds there may be used bifunctional organic compounds such as diamines, for example, cyclic, and especially aromatic, diamines such as 4:4'-diamino-diphenyl, 4:4'-diaminostilbene-2:2'-disulfonic acid, 1:4- or 1:3-diaminobenzene and above all 1:4-diaminobenzene-2-sulfonic acid and 1:3-diaminobenzene-4-sulfonic acid. There may also be used nitraniline or monoacyl-derivatives of organic diamines followed, after the reaction with the dyestuff sulfonic acid chloride, by reduction or hydrolysis to form a new —$NH_2$ group. Care must be taken by choosing the starting materials that the product obtained contains at least one acylatable amino group and at least one carboxyl or sulfonic acid group. To this end there are used as starting material dyestuffs containing at least one sulfonic acid halide group and they are reacted with diamines containing carboxyl and/or sulfonic acid groups. When diamines free from sulfonic acid groups are used they must be reacted with at most one sulfonic acid halide group of a dyestuff sulfonic acid halide of the above kind, containing at least two such groups.

The dyestuffs containing acylatable amino groups are condensed in the process of this invention at their amino groups with trihalogen-1:3:5-triazine compounds or with dihalogen-triazines of the formula (1)
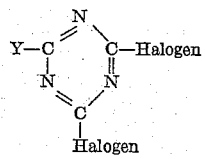

obtainable therefrom, in which formula Y represents the radical of an organic hydroxyl-compound bound through its oxygen atom, or an —NH$_2$ group or the radical of an amine of dyestuff or non-dyestuff character bound through the amino group, advantageously the radical of such an amine containing a water-solubilising group.

The dihalogen-triazines of this composition can be obtained by methods in themselves known from cyanuric halides, such as cyanuric bromide or cyanuric chloride, for example, by reacting one mol of cyanuric chloride with 1 mol of an amino- or hydroxy-compound of dyestuff or non-dyestuff character, for example, the dyestuff mentioned above or amino-anthraquinone dyestuffs such as are obtainable by condensing 1-amino-4-bromanthraquinone-2-sulfonic acid with a diamine or a monoacyl-derivative of an aromatic diamine and subsequently hydrolysing the acyl group. As compounds of non-dyestuff character there may be mentioned, for example, ammonia, aliphatic or aromatic hydroxy-compounds, such as methyl alcohol, ethyl alcohol or butyl alcohol, phenol, ortho-, meta- or para-cresol, 4-secondary butylphenol, 4-tertiary amylphenol, dialkyl-phenols, para-chlorophenol and above all organic compounds of nitrogen, such as methylamine, dimethylamine, ethylamine, diethylamine, isopropylamine, butylamine, hexyl-amine, phenylamine, tolylamine, 4-chlorophenylamine, N-methyl-phenylamine or ethanolamine, acetamide, butyric acid amide, urea, thiourea, toluene sulfonic acid amide, glycine, amino-carbonic acid esters, such as the methyl or ethyl ester, amino-acetic acid esters, such as the methyl or ethyl ester, aminoacetamide, 1-aminobenzene-2- or -4-methylsulfone, 1-aminobenzene-2:5-disulfonic acid, aminobenzoic acids and sulfonic acids thereof, 1-aminobenzene-2-, -3- or -4-sulfonic acid or sulfonamides or sulfones thereof. The primary condensation products so obtained contain two reactive halogen atoms. Those which contain no sulfonic acid groups are condensed only with dyestuffs containing at least one sulfonic acid group, whereas the primary condensation products of the Formula 1 which contain one or two sulfonic acid groups in the radical Y may be reacted with dyestuffs of the aforesaid kind which are free from sulfonic acid groups.

The condensation of the cyanuric chloride or of the dihalogen-triazine compounds with the dyestuffs containing acylatable groups is advantageously carried out in the presence of an acid-binding agent, such as sodium acetate, sodium hydroxide or sodium carbonate, and under conditions such that the final product still contains at least one exchangeable halogen atom, for example, in an organic solvent or at a relatively low temperature in an aqueous medium.

The dyestuffs obtained by the process of this invention are advantageously isolated at a low temperature, for example, by salting out and filtration or by evaporating the mixture resulting from the preparation of the dyestuff. The filtered dyestuffs may, if desired, be dried after the addition of an extender, and advantageously the drying is carried out at not too high a temperature and under reduced pressure. By spray drying the entire mixture resulting from preparation of the dyestuff it is possible in some cases to produce dry preparations directly, that is to say, without intermediate isolation of the dyestuff. By these methods valuable new dry preparations are obtained, which are suitable for the preparation of stock solutions or dyebaths, or if desired, printing pastes.

The dyestuffs of this invention are new. They are valuable dyestuffs for dyeing or printing a very wide variety of materials, especially polyhydroxylated materials of fibrous structure and also synthetic fibers, for example, of regenerated cellulose, and also natural materials, for example, cellulose, linen or above all cotton. They are suitable for dyeing by the so-called direct dyeing method from an aqueous alkaline bath which may contain a salt in high concentration, and above all by the printing or pad dyeing method, in which the dyestuff is applied to the material to be dyed by printing or foularding and fixed on the fiber by means of an acid-binding agent.

The dyeings produced with the new dyestuffs on cellulose-containing fibers are usually distinguished by the purity of their tints, by their good fastness to light above all by their excellent fastness to washing.

The following examples illustrate the invention, the parts and percentages being by weight unless otherwise stated, and the relationship of parts by weight to parts by volume being the same as that of the kilogram to the liter:

*Example 1*

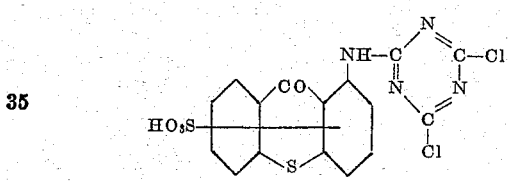

18.5 parts of cyanuric chloride are dissolved in 80 parts of acetone and the solution is poured in a fine jet into 250 parts of ice water, while stirring well. Into the resulting cyanuric chloride suspension is run a solution, cooled to 0° C., of 32.9 parts of the sodium salt of 1-amino-thioxanthone sulfonic acid (prepared as described in Example 4 of French Patent No. 974,872, granted October 4, 1950, to The Anchor Chemical Company Limited), in 1500 parts of water, and the pH value is maintained between 6.0 and 7.5 by the dropwise addition of about 55 parts by volume of a 2 N-solution of sodium carbonate. After stirring the mixture for ½ hour at 0–4° C., the dyestuff is precipitated from the solution by the addition of sodium chloride and is filtered off. The dyestuff is advantageous washed with a solution of 5 parts of disodium phosphate, 3 parts of monopotassium phosphate and 30 parts of sodium chloride in 200 parts of water, then subjected to strong suction on the filter, and dried at 30–35° C. in vacuo.

Cotton or regenerated cellulose can be dyed with the above dyestuff in the following manner to yield yellow tints of good fastness to chlorine, washing and light:

2 parts of the dyestuff are dissolved together with 80 parts of trisodium phosphate in 400 parts of water and the mixture is diluted to 4000 parts. After the addition of 80 parts of sodium chloride, 100 parts of a cotton fabric are entered into the dyebath, the temperature is raised to 60° C. in ½ hour, and a further 80 parts of sodium chloride are added, the temperature is increased to 80° C. in the course of ¼ hour, and the latter temperature is maintained for ½ hour. The material is then rinsed and soaped for 15 minutes in a boiling solution of 0.3% strength of a non-ionic detergent. The yellow dyeing so obtained has excellent properties of fastness.

Instead of trisodium phosphate, sodium carbonate can be used with equal success in this example.

Example 2

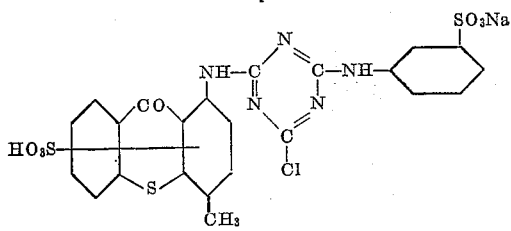

100 parts of ice are added to a solution of 18.5 parts of cyanuric chloride in 80 parts of acetone. The suspension of cyanuric chloride so obtained is admixed with a solution cooled to 0° C., of 19.5 parts of the sodium salt of 1-aminobenzene-3-sulfonic acid in 300 parts of water. 55 parts by volume of a 2 N-solution of sodium carbonate are immediately added dropwise to the mixture so as to maintain the pH value between 5.0 and 7.0, and the temperature is maintained between 0° C. and 4° C. by external cooling. There is obtained a clear solution of the primary condensation product of equimolecular proportions of cyanuric chloride and 1-aminobenzene-3-sulfonic acid.

The solution so obtained is immediately poured into a solution of 34.3 parts of the sodium salt of 1-amino-4-methyl-thioxanthone sulfonic acid (prepared as described in Example 5 of French Patent No. 974,872, granted October 4, 1950, to The Anchor Chemical Company Limited), in 1000 parts of water, and 55 parts by volume of a 2 N-solution of sodium carbonate are added dropwise at 35–40° C. so as to maintain the pH value between 5.5 and 7.5. The whole is stirred for 2 hours at that temperature, during which the pH value should remain at 7.0 to 7.5. The dyestuff so obtained is precipitated by the addition of sodium chloride, filtered off, washed with sodium chloride solution of 15% strength, and then dried at 80° C. in vacuo.

Cotton or regenerated cellulose is dyed a yellow tint of very good fastness to washing, chlorine and light in the following manner:

1 part of the above dyestuff is dissolved in 100 parts of water. A cotton fabric is impregnated with the solution at 80° C. on a foulard, the excess of liquid is removed by squeezing until the material retains 75% of its weight of dyestuff solution. The material so impregnated is dried and then impregnated at room temperature in a solution containing, per liter, 10 grams of sodium hydroxide and 300 grams of sodium chloride, and the material is then squeezed to a weight increase of 75% and steamed for 60 seconds at 100–101° C. The material is then rinsed, treated in sodium bicarbonate solution of 0.5% strength, rinsed, soaped at the boil for ¼ hour in a solution of 0.3% strength of a non-ionic detergent, rinsed and dried. There is obtained a yellow dyeing which is fixed fast to boiling.

Example 3

100 parts of ice are added to a solution of 19 parts of cyanuric chloride in 80 parts of acetone. The suspension of cyanuric chloride so obtained is admixed with a solution, cooled to 0° C., of 30 parts of the disodium salt of 1-aminobenzene-2:5-disulfonic acid in 330 parts of water. 55 parts by volume of a 2 N-solution of sodium carbonate are added dropwise so as to maintain the pH value constantly between 5.0 and 7.0 and the temperature is maintained at 0–4° C. There is obtained a clear solution of the primary condensation product of equimolecular proportions of cyanuric chloride and 1-aminobenzene-2:5-disulfonic acid.

The solution so obtained is immediately poured into a solution of 34.3 parts of the sodium salt of 1-amino-4-methyl-thioxanthone sulfonic acid in 1000 parts of water, and 55 parts by volume of a 2 N-solution of sodium carbonate are added dropwise at 60–70° C. so as to maintain the pH value between 5.5 and 7.0. The resulting dyestuff is precipitated by the addition of sodium chloride, filtered off, washed with sodium chloride solution of 20% strength and then dried in vacuo at 70–80° C.

Cotton or regenerated cellulose can be dyed with the resulting dyestuff by the method described at the end of Example 2 yielding tints of good fastness to washing, chlorine and light.

Example 4

A solution of 6.8 parts of the sodium salt of 2:4-dichloro-6-phenylamino-1:3:5-triazine-4'-sulfonic acid in 100 parts of water are added to 100 parts of a neutral solution of the sodium salt of 5 parts of the sulfonated condensation product of 1:4-diaminoanthraquinone and thiosalicylic acid (prepared, for example, as described in Example 11 of French Patent No. 974,872, granted October 4, 1950, to The Anchor Chemical Company Limited). The whole is heated to 60–70° C. and mineral acid liberated during the condensation is neutralised by the gradual addition of 11 parts by volume of a 2 N-solution of sodium carbonate so as to maintain the pH value of between 5.0 and 7.0. The dyestuff is precipitated in the usual manner by the addition of sodium chloride, and is then isolated by filtration and dried in vacuo at 70° C.

Cotton or regenerated cellulose is dyed grey tints of good fastness to washing by the method described at the end of Example 1.

By using in this example, instead of 6.8 parts of the sodium salt of 2:4-dichloro-6-phenylamino-1:3:5-triazine-4'-sulfonic acid, the same quantity of the sodium salt of 2:4-dichloro-6-phenylamino-1:3:5-triazine-3'-sulfonic acid, there is obtained a dyestuff having similar properties.

Example 5

3.8 parts of the sodium salt of α-amino-naphthothioxanthone sulfonic acid (prepared as described in Example 7 of French Patent No. 974,872, granted October 4, 1950, to The Anchor Chemical Company Limited), are dissolved in 100 parts of water at 70° C., and then a solution of 3.4 parts of the sodium salt of 2:4-dichloro-6-phenylamino-1:3:5-triazine-3'-sulfonic acid in 50 parts of water is added. At a temperature of 60–70° C. the mineral acid liberated during the condensation is continuously neutralized by the addition of a total of 5.5 parts by volume of 2 N-solution of sodium carbonate so as to maintain the pH value between 5.0 and 7.0.

The dyestuff is precipitated by the addition of sodium chloride, and is then isolated by filtration and dried in vacuo at 70–80° C.

Cotton and regenerated cellulose can be dyed by the dyestuff khaki-brown tints of good fastness to washing by the method described at the end of Example 2.

Example 6

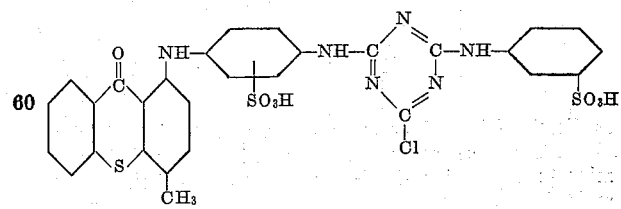

4.4 parts of the sodium salt of 1-(4'-aminophenylamino)-4-methyl-thioxanthone sulfonic acid of the probable formula

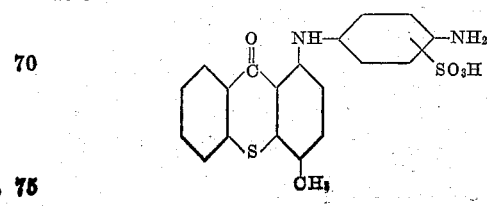

are dissolved in 100 parts of water, and then the solution is poured into a solution of 3.4 parts of the sodium salt of 2:4-dichloro-6-phenylamino-1:3:5-triazine-3'-sulfonic acid in 100 parts of water. The condensation is carried out at 60–70° C., and the mineral acid split off is neutralised by the gradual addition of a total of 10 parts by volume of a 1 N-solution of sodium hydroxide so as to maintain a pH value between 5.0 and 7.0.

The dyestuff is precipitated by the addition of sodium chloride at room temperature, and then isolated by filtration and dried in vacuo at 70° C.

Cotton or regenerated cellulose is dyed by the dyestuff red-brown tints of very good fastness to washing by the method described at the end of Example 2.

The 1-(4'-aminophenylamino)-4-methyl-thioxanthone sulfonic acid used as starting material is obtained as follows: 5 parts of 1:4-diaminobenzene are dissolved in 50 parts of dimethyl aniline, and maintained at a gentle boil with 4.4 parts of 1-chloro-4-methyl-thioxanthone for 5 hours at 185–190° C. The solvent is then expelled with steam and the residue is filtered while hot. The crude 1-(4'-aminophenylamino)-4-methyl-thioxanthone can be purified by recrystallisation from dioxane, whereby the pure product is obtained in the form of red-brown crystals. For sulfonation the product is heated in 12 times its weight of oleum containing 10% of SO₃ for 2 hours at 100° C., and 1-(4'-aminophenylamino)-4-methyl-thioxanthone sulfonic acid is isolated by pouring the sulfonation mixture on to sodium chloride solution of 10% strength and then filtering. By neutralising the filter residue with dilute sodium hydroxide solution there is obtained the corresponding sodium salt of 1-(4'-aminophenylamino)-4-methyl-thioxanthone sulfonic acid.

*Example 7*

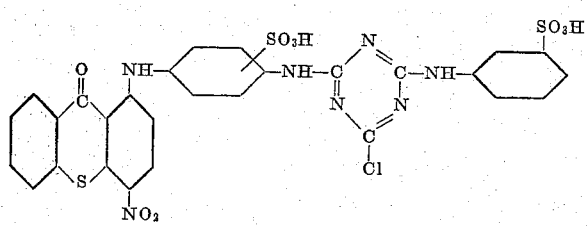

4.7 parts of the sodium salt of 1-(4'-aminophenylamino)-4-nitro-thioxanthone sulfonic acid of the probable formula

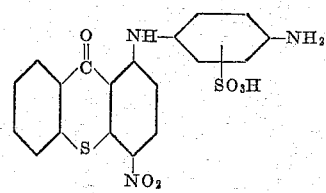

are dissolved in 100 parts of water, and condensed with 2.4 parts of the sodium salt of 2:4-dichloro-6-phenylamino-1:3:5-triazine-3'-sulfonic acid as described in Example 6.

There is obtained a dyestuff which dyes, by the method described in Example 2, cotton or regenerated cellulose violet-brown tints of very good fastness to washing.

The 1-(4'-aminophenylamino)-4-nitro-thioxanthone used in this example is obtained by condensing 1-chloro-4-nitro-thioxanthone and an excess of 1:4-diaminobenzene in boiling dioxane. The new compound crystallises from aqueous pyridine in brown-red crystals. For the purpose of sulfonation the compound is treated with oleum containing 10% of SO₃ in the manner described in the last paragraph of Example 6.

*Example 8*

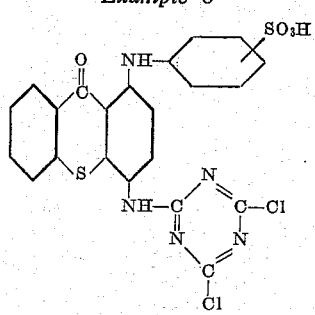

18.5 parts of cyanuric chloride are dissolved in 80 parts of acetone and the solution is poured in a fine stream into 250 parts of ice water, while stirring well. Into the cyanuric chloride suspension is run a solution, cooled to 0° C., of 42 parts of the sodium salt of 1-phenylamino-4-amino-thioxanthone sulfonic acid in 1000 parts of water and the pH value is maintained between 5.0 and 7.0 by the dropwise addition of a total of 55 parts by volume of a 2 N-solution of sodium carbonate at a temperature of 2–4° C. The dyestuff is precipitated by the addition of sodium chloride and filtered off.

The filter residue is advantageously washed with a solution of 5 parts of disodium phosphate, 3 parts of monopotassium phosphate and 30 parts of sodium chloride in 200 parts of water, and then subjected to strong suction, and dried in vacuo at 30–40° C.

The dyestuff in its dry state is a yellow powder which dyes cotton or regenerated cellulose orange-yellow tints which are fast to washing and light, as follows:

2 parts of the dyestuff are dissolved in the cold in 2000 parts of water. There are then added 100 parts of a sodium carbonate solution of 10% strength and 250 parts of a sodium chloride solution of 20% strength. 100 parts of well wetted cotton yarn are entered into the resulting dyebath at 20–30° C., and a further 250 parts of a solution of sodium chloride of 20% strength are added after 30 minutes. Dyeing is continued for a further 60 minutes at 25–35° C. The reddish yellow dyeing so obtained is then rinsed with cold water and dried. The resulting orange-yellow dyeing is very fast to washing.

The 1-phenylamino-4-amino-thioxanthone sulfonic acid used in this example may be prepared as follows:

1-chloro-4-nitro-thioxanthone is condensed in boiling aniline to form 1-phenylamino-4-nitro-thioxanthone (melting at 228° C.), and the latter is converted by reduction of the nitro group in the usual manner, for example, by catalytic hydrogenation with Raney nickel, into 1-phenylamino-4-amino-thioxanthone. For sulfonation the amino-derivative is heated with sulfuric acid of 100% strength for a short time at 90–100° C., and the 1-phenylamino-4-amino-thioxanthone sulfonic acid is isolated by introducing the sulfonation mixture into sodium chloride solution of 10% strength.

*Example 9*

5 parts of a solution of the sodium salt of 1-(4'-aminophenylamino)-4-nitro-thioxanthone - S - dioxide - sulfonic acid of the probable formula

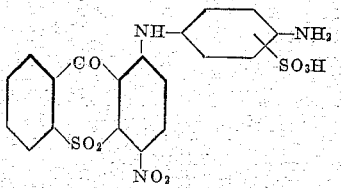

in 100 parts of water are condensed with 3–4 parts of the sodium salt of 2:4-dichloro-6-phenylamino-1:3:5-triazine-3'-sulfonic acid by the method described in Example 6 and isolated.

A dyestuff is obtained which dyes cotton and regenerated cellulose by the method described in Examples 1 and 2 violet-grey tints of very good fastness to washing.

The 1-(4'-aminophenylamino)-4-nitro-thioxanthone-S-dioxide-sulfonic acid used in this example is obtained as follows:

1-chloro-4-nitro-thioxanthone is oxidized in glacial acetic acid with hydrogen peroxide to 1-chloro-4-nitro-thioxanthone-S-dioxide and then condensed in boiling nitrobenzene with 1:4-diamino-benzene to 1-(4'-aminophenylamino)-4-nitro-thioxanthone - S - dioxide. For sulfonation the product is treated with oleum containing 10% of $SO_3$ at a temperature of 130 to 135° C.

Example 10

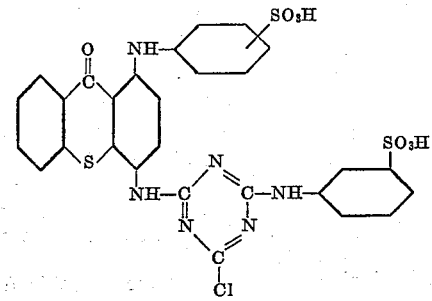

4.2 parts of the sodium salt 1-phenylamino-4-aminothioxanthone sulfonic acid are reacted with 3.4 parts of the sodium salt of the condensation product of equimolecular quantities of cyanuric chloride and 1-aminobenzene-3-sulfonic acid, that is to say, 2:4-dichloro-6-phenylamino-1:3:5-triazine-3'-sulfonic acid, as described in Example 6.

There is obtained a dystuff which dyes cotton and regenerated cellulose by the method described at the end of Example 2 clear orange-yellow tints of good fastness to light and washing.

Similar dyestuffs are obtained by using in this example, instead of 1-aminobenzene-3-sulfonic acid, 1-aminobenzene-2-sulfonic acid or 1-aminobenzene-4-sulfonic acid or corresponding quantities of 1-aminobenzene-2:5-disulfonic acid or 2-aminonaphthalene-6-sulfonic acid or 2-aminonaphthalene-4:8-disulfonic acid.

Example 11

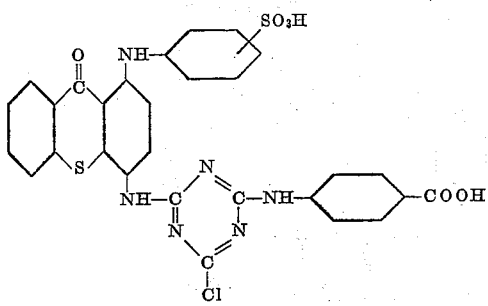

To a solution of 1.9 parts of cyanuric chloride in 10 parts of acetone 12 parts of ice are added while stirring. The resulting fine suspension of cyanuric chloride is then poured into a solution, cooled to 0° C., of 1.4 parts of 4-aminobenzoic acid in 40 parts of water and 10 parts by volume of a 1 N-solution of sodium hydroxide. The whole is stirred at a pH value of 6.0 to 7.0 until aminobenzoic acid can no longer be detected.

Into the resulting condensation products of equimolecular proportions of cyanuric chloride and 4-aminobenzoic acid is run a solution of 4.2 parts of the sodium salt of 1-phenylamino-4-aminothioxanthone sulfonic acid in 200 parts of water. At 60-70° C. the pH value is maintained continuously between 6.0 and 7.5 to the end of the condensation by the gradual addition of 5.5 parts by volume of a 2 N-solution of sodium carbonate.

By the addition of sodium chloride the dyestuff is completely precipitated, and it is then isolated by filtration and dried in vacuo at 70° C.

Cotton and regenerated cellulose are dyed by the method described in Example 2 orange-yellow tints of good fastness to washing and light.

Similar dyestuffs are obtained by using in this example, instead of 4-aminobenzoic acid, 2-aminobenzoic acid or 3-aminobenzoic acid.

Example 12

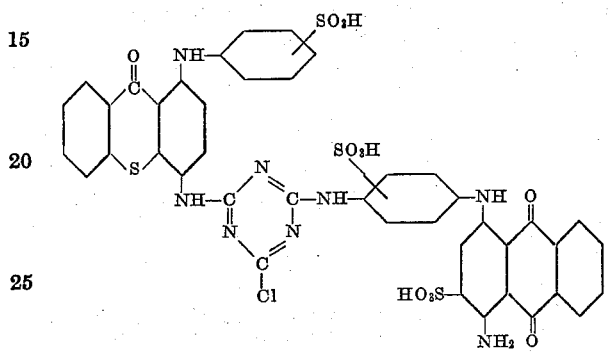

100 parts of ice are added to a solution of 19 parts of cyanuric chloride in 80 parts of acetone. The resulting suspension of cyanuric chloride is added to a solution, cooled to 3° C., of 53.3 parts of the disodium salt of 1-amino - 4 - (4' - aminophenylamino) - anthraquinone-2:3'-disulfonic acid in 2000 parts of water. At 3-5° C. and a pH value of 5.0 to 7.0 a total of 50 parts by volume of a 2 N-solution of sodium carbonate is run in. When the monocondensation is complete a solution of 42 parts of the sodium salt of 1-phenylamino-4-amino-thioxanthone sulfonic acid in 2000 parts of water is added, and, while moderately heating the mixture to 50-60° C., a further 50 parts by volume of a 2 N-solution of sodium carbonate is added dropwise to maintain the pH value at 5.5 to 7.0. When the condensation is finished sodium chloride is added to the green dyestuff solution and the precipitated dyestuff is filtered off and dried in vacuo at 70-80° C.

The dyestuff dyes cotton and regenerated cellulose by the methods described in Examples 1 and 2 green tints of good fastness to washing and light.

Example 13

3.5 parts of the sodium salt of 1:4-diamino-thioxanthone sulfonic acid are dissolved in 100 parts of water, and the solution is added to a solution of 3.4 parts of the sodium salt of 2:4-dichloro-6-phenylamino-1:3:5-triazine-3'-sulfonic acid in 100 parts of water. The condensation takes place very rapidly at 40-50° C. The mineral acid that splits off is neutralized by the addition of 5.5 parts by volume of a 2 N-solution of sodium carbonate while maintaining a pH-value of 5.0 to 7.0.

By the addition of sodium chloride the yellow dyestuff of the probable formula

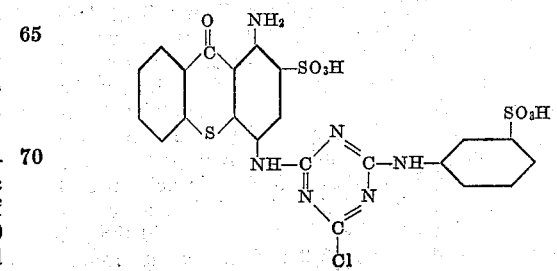

is precipitated in the usual manner, isolated and dried at 70° C. in vacuo.

It dyes cotton and regenerated cellulose by the methods described in Example 2 yellow tints of good fastness to washing and light.

Similar dyestuffs are obtained by using in this example, instead of 2:4-dichloro-6-phenylamino-1:3:5-triazine-3'-sulfonic acid, 2:4-dichloro-6-phenylamino-1:3:5-triazine-4'-sulfonic acid or 2:4-dichloro-6-phenylamino-1:3:5-triazine-2'-sulfonic acid.

The 1:4-diamino-thioxanthone sulfonic acid used as starting material can be prepared as follows: 1-chloro-4-nitro-thioxanthone is dissolved in 10 times its weight of nitrobenzene, and converted into 1-amino-4-nitro-thioxanthone by introducing gaseous ammonia at 150–160° C. By reducing the nitro group there is obtained the corresponding diamino-compound. For the purpose of sulfonation the 1:4-diamino-thioxanthone is heated in 12 times its weight of oleum containing 10% of $SO_3$ at 100° C. for one hour, and the resulting 1:4-diamino-thioxanthone sulfonic acid is isolated by pouring the sulfonation mixture into a sodium chloride solution of 10% strength.

*Example 14*

18.5 parts of cyanuric chloride are dissolved in 80 parts of acetone, and the solution is run in the form of a fine jet into 250 parts of ice water, while stirring well. The cyanuric chloride suspension is then allowed to cool to 0° C., a neutral solution of 35 parts of the sodium salt of 1:4-diamino-thioxanthone sulfonic acid in 1000 parts of water is run in, and the pH value is maintained between 5.0 and 7.0 by adding dropwise 100 parts by volume of a 1 N-solution of sodium hydroxide at a temperature of 2–4° S. 150 parts by volume of a 2N-solution of ammonium hydroxide are then slowly run in in such manner that the pH value does not exceed 8.5 and the temperature does not exceed 35° C.

By the addition of sodium chloride the dyestuff of the probable formula

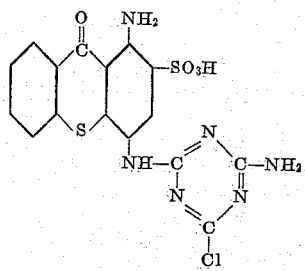

is precipitated, and it is isolated by filtration and dried in vacuo at 70° C.

It dyes cotton and regenerated cellulose by the method described in Example 2 yellow tints of good fastness to washing and light.

*Example 13*

A solution of 19 parts of cyanuric chloride in 80 parts of acetone is added to a solution, cooled by the addition of ice to 0° C., of 35 parts of the sodium salt of 1:4-diaminothioxane sulfonic acid in 1300 parts of water. The reaction mixture is stirred at 0–4° C., during which a pH value is maintained between 5.0 and 7.0 by the addition of a total of 100 parts by volume of a 1 N-solution of sodium hydroxide. When the monocondensation is complete, a solution of 19.6 parts of the sodium salt of 1-hydroxybenzene-3-sulfonic acid in 300 parts of water is run in and the whole is heated to 40–50° C. During the splitting off of mineral acid the pH value is maintained between 5.0 and 7.0 by neutralization with a total of 100 parts by volume of a 1 N-solution of sodium hydroxide. The yellow dyestuff of the probable formula

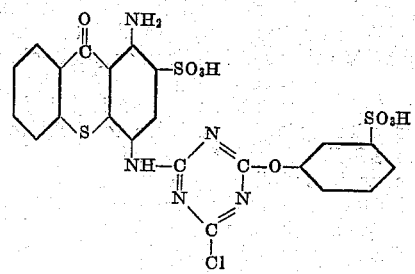

is precipitated by the addition of sodium chloride, filtered off and dried in vacuo at 70° C.

It dyes cotton and regenerated cellulose by the method described in Example 2 yellow tints of good fastness to washing and light.

*Example 16*

3.7 parts of the sodium salt of 1-ethylamino-4-amino-thioxanthone sulfonic acid are dissolved in 100 parts of water, and condensed with an aqueous solution of 3.4 parts of the sodium salt of 2:4-dichloro-6-phenylamino-1:3:5-triazine-2'-sulfonic acid and isolated in the manner described in Example 6.

There is obtained a dyestuff of the probable formula

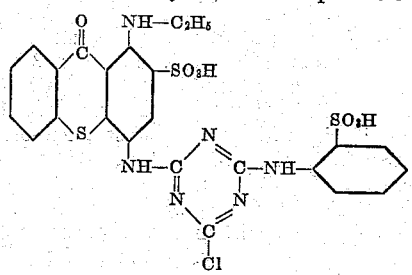

which dyes cotton and regenerated cellulose by the method described in Example 2 yellow-orange tints of good fastness to washing and light.

The 1-ethylamino-4-amino-thioxanthone sulfonic acid used as starting material can be prepared, for example, by the method described in Example 13, last paragraph, but by the introduction of monoethylamine instead of gaseous ammonia.

*Example 17*

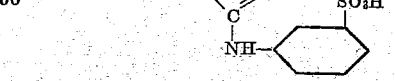

4.4 parts of the sodium salt of 1-(4'-aminophenyl-amino)-4-amino-thioxanthone sulfonic acid are dissolved in 100 parts of water, and a solution of 6.8 parts of the sodium salt of 2:6-dichloro-6-phenylamino-1:3:5-triazine-3'-sulfonic acid in 100 parts of water is added. The condensation takes place very rapidly at 40–50° C., while the mineral acid split off is continuously neutralized by the addition of a total of 10 parts by volume of a 2 N-solution of sodium carbonate so as to maintain the pH value of 6.0 to 7.0.

The dyestuff is salted out from solution with sodium chloride, filtered off and dried in vacuo at 70° C. It dyes cotton and regenerated cellulose by the methods described in Examples 1 and 2 yellow-brown tints of good fastness to washing.

The 1-(4'-aminophenylamino)-4-amino-thioxanthone sulfonic acid used in this example is obtained from the 1-(4'-aminophenylamino)-4-nitro-thioxanthone described in the last paragraph of Example 7 by reduction of the nitro group followed by sulfonation with sulfuric acid of 100% strength at 100° C.

*Example 18*

3.2 parts of the sodium salt of 1-amino-acridone sulfonic acid are dissolved in 100 parts of water and condensed with 3.4 parts of the sodium salt of 2:4-dichloro-6-phenylamino-1:3:5-triazine-3'-sulfonic acid by the method described in Example 6 and isolated.

A dyestuff corresponding to the formula is obtained.

Cotton and regenerated cellulose are dyed by the method described in Example 2 yellow tints of very good fastness to washing.

The 1-amino-acridone sulfonic acid used as starting material is obtained from 1-nitro-acridone (prepared according to Ullmann, A 355, 332) by sulfonation with oleum containing 20% of $SO_3$ followed by reduction of the nitro group to the corresponding amino compound.

*Example 19*

2.8 parts of the sodium salt of 1-amino-acridone-4-carboxylic acid are dissolved in 200 parts of water at 60° C. and condensed with 3.4 parts of the sodium salt of 2:4-dichloro-6-phenyl-amino-1:3:5-triazine-3'-sulfonic acid according to the method described in Example 6 and isolated.

A dyestuff powder which is yellow-green in its dry state is obtained which dyes cotton and regenerated cellulose by the methods described in Examples 1 and 2 yellow tints of good fastness to chlorine and washing.

*Example 20*

4 parts of the sodium salt of 1-anilino-4-amino-acridone sulfonic acid are dissolved in 100 parts of water and condensed with 3.4 parts of the sodium salt of 2:4-dichloro-6-phenylamino-1:3:5-triazine-3'-sulfonic acid by the method described in Example 6 and isolated.

A dyestuff powder which is yellow-brown in its dry state is obtained which dyes cotton and regenerated cellulose by the method described at the end of Example 2 orange-yellow tints of good fastness to washing.

The 1-anilino-4-amino-acridone-sulfonic acid used in this example is obtained by reducing 1-anilino-4-nitro-acridone to 1-anilino-4-amino-acridone and then sulfonating with sulfuric acid of 100% strength at 90 to 100° C.

What is claimed is:

1. Water-soluble dyestuff of the formula wherein X is a member selected from the group consisting of —NH—, —$SO_2$— and —S—; and Y is a member selected from the group consisting of —H and wherein A is a member selected from the group consisting of the chlorine atom, the —$NH_2$ group, the monosulfophenylamino, the disulfophenylamino, the monosulfonaphthylamino, the disulfonaphthylamino, the methoxy, the sulfophenoxy, the sulfoanthraquinonylamino and the carboxyphenylamino groups; and $n$ is a whole positive number up to 2; said water-soluble dyestuff containing at least one and at most two groups, and said water-soluble dyestuff, in addition to the last-mentioned group, containing a member selected from the group consisting of the sulfonic acid group and the carboxylic acid group.

2. Water soluble thioxanthone dyestuff of the formula wherein X represents the sulfophenylamino group, Z represents the sulfonic acid group, and $m$ and $n$ each represents a whole number up to 2.

3. Water soluble thioxanthone dyestuff of the formula wherein X represents the sulfophenylamino group.

4. Water soluble thioxanthone dyestuff of the formula

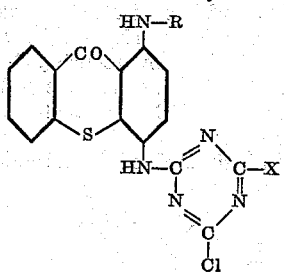

wherein X and R each represents the sulfophenylamino group.

5. The dyestuff of the formula

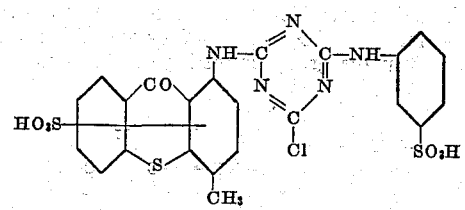

6. The dyestuff of the forumla

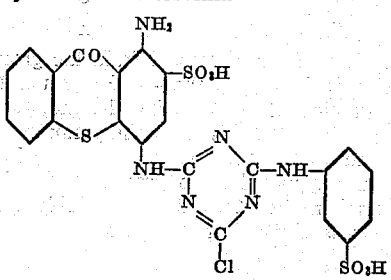

7. The dyestuff of the formula

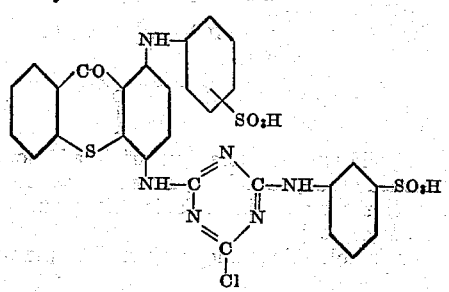

8. The dyestuff of the formula

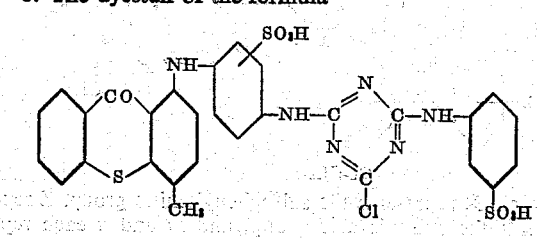

9. The dyestuff of the formula

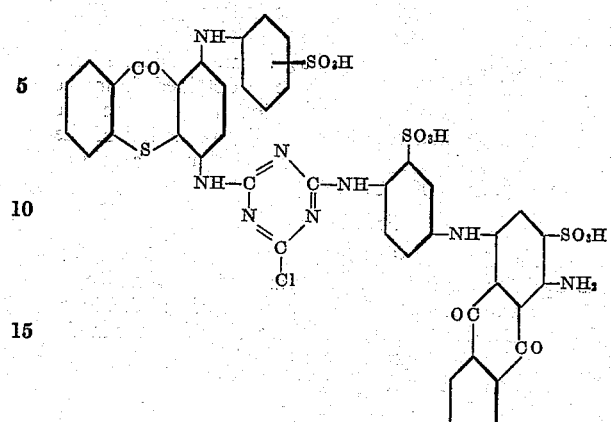

10. The dyestuff of the formula

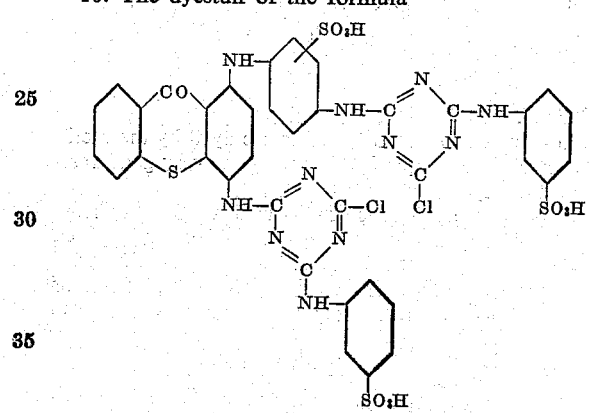

11. The dyestuff of the formula

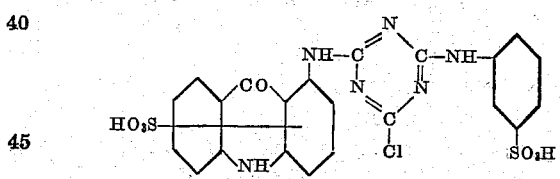

References Cited in the file of this patent

UNITED STATES PATENTS 1,719,792 Ackermann _____ July 2, 1929

FOREIGN PATENTS 237,872 Great Britain _____ Jan. 14, 1926

OTHER REFERENCES

Lubs: The Chemistry of Synthetic Dyes and Pigments, pp. 534–541, ASC Monograph 127, Reinhold Publishing Corp. (1955).

UNITED STATES PATENT OFFICE
CERTIFICATE OF CORRECTION

Patent No. 2,993,045                                              July 18, 1961

Max Staeuble et al.

It is hereby certified that error appears in the above numbered patent requiring correction and that the said Letters Patent should read as corrected below.

Column 1, lines 68 to 71, the formula should appear as shown below instead of as in the patent:

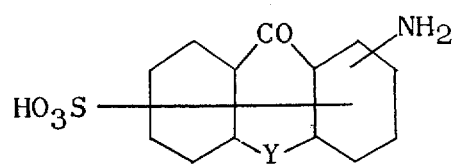

column 4, line 53, for "advantageous" read -- advantageously --; line 71, for "detergent," read -- detergent. --; column 9, line 36, for "dystuff" read -- dyestuff --; column 11, line 35, for "2-4° S." read -- 2-4° C. --.

Signed and sealed this 20th day of February 1962.

(SEAL)
Attest:

ERNEST W. SWIDER                                         DAVID L. LADD

Attesting Officer                                             Commissioner of Patents